United States Patent
Ahmed et al.

(10) Patent No.: US 12,235,694 B2
(45) Date of Patent: Feb. 25, 2025

(54) CALCULATE MINIMUM REQUIRED COOLING FAN SPEEDS

(71) Applicant: Dell Products L.P., Round Rock, TX (US)

(72) Inventors: Bilal Ahmed, Austin, TX (US); Hasnain Shabbir, Round Rock, TX (US); Richard Eiland, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 17/846,402

(22) Filed: Jun. 22, 2022

(65) Prior Publication Data

US 2023/0418344 A1    Dec. 28, 2023

(51) Int. Cl.
  *G05B 15/02*    (2006.01)
  *G06F 1/20*     (2006.01)
(52) U.S. Cl.
  CPC .............. *G06F 1/20* (2013.01); *G05B 15/02* (2013.01)
(58) Field of Classification Search
  CPC .................................. G01F 1/20; G01F 1/206
  See application file for complete search history.

(56) References Cited

U.S. PATENT DOCUMENTS

| | | | |
|---|---|---|---|
| 8,212,501 B2 * | 7/2012 | Artman ................. | F04D 27/004 |
| | | | 318/471 |
| 9,192,076 B2 * | 11/2015 | Artman .............. | H05K 7/20209 |
| 9,681,577 B2 * | 6/2017 | Ragupathi .......... | G05B 23/0289 |
| 9,804,657 B2 * | 10/2017 | Moss ...................... | G06F 1/3203 |
| 9,974,210 B2 * | 5/2018 | Kunnathur Ragupathi ................ | |
| | | | H05K 7/20736 |
| 10,136,558 B2 * | 11/2018 | Shabbir .............. | H05K 7/20727 |
| 10,331,189 B2 * | 6/2019 | Lovicott ................. | G06F 1/206 |
| 10,582,646 B2 * | 3/2020 | Shabbir .................. | G06F 1/206 |
| 10,809,778 B2 * | 10/2020 | Curtis ............... | H05K 7/20727 |
| 10,838,471 B2 * | 11/2020 | Shabbir .................. | G06F 1/206 |
| 2018/0267582 A1 * | 9/2018 | Woo ...................... | G05D 13/62 |
| 2021/0329813 A1 * | 10/2021 | Shabbir ............. | H05K 7/20136 |

\* cited by examiner

*Primary Examiner* — Rina I Duda
(74) *Attorney, Agent, or Firm* — Larson Newman, LLP

(57) ABSTRACT

An information handling system may calculate multiple temperature changes within the information handling system. Each of the temperature changes is across a different bank of components of the information handling system. The system may calculate multiple inlet temperatures, each of which is associated with a different component of the information handling system. The inlet temperatures are utilized in determining whether cooling requirements for the system configuration are met. Based on the temperature changes and the inlet velocities, the system may determine whether the cooling requirements are met. In response to the cooling requirements for the system configuration not being met, the system may decrease a current cooling fan speed for the information handling system. In response to the cooling requirements for the system configuration being met, the system may store the current cooling fan speed.

20 Claims, 4 Drawing Sheets

CALCULATE MINIMUM REQUIRED COOLING FAN SPEEDS

FIELD OF THE DISCLOSURE

The present disclosure generally relates to information handling systems, and more particularly relates to calculating minimum required cooing fan speeds.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems.

Information handling systems can also implement various virtualized architectures. Data and voice communications among information handling systems may be via networks that are wired, wireless, or some combination.

SUMMARY

An information handling system may calculate multiple temperature changes within the information handling system. Each of the temperature changes is across a different bank of components of the information handling system. The system may calculate multiple inlet temperatures, each of which is associated with a different component of the information handling system. The inlet temperatures are utilized in determining whether cooling requirements for the system configuration are met. Based on the temperature changes and the inlet velocities, the system may determine whether the cooling requirements are met. In response to the cooling requirements for the system configuration not being met, the system may decrease a current cooling fan speed for the information handling system. In response to the cooling requirements for the system configuration being met, the system may store the current cooling fan speed.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
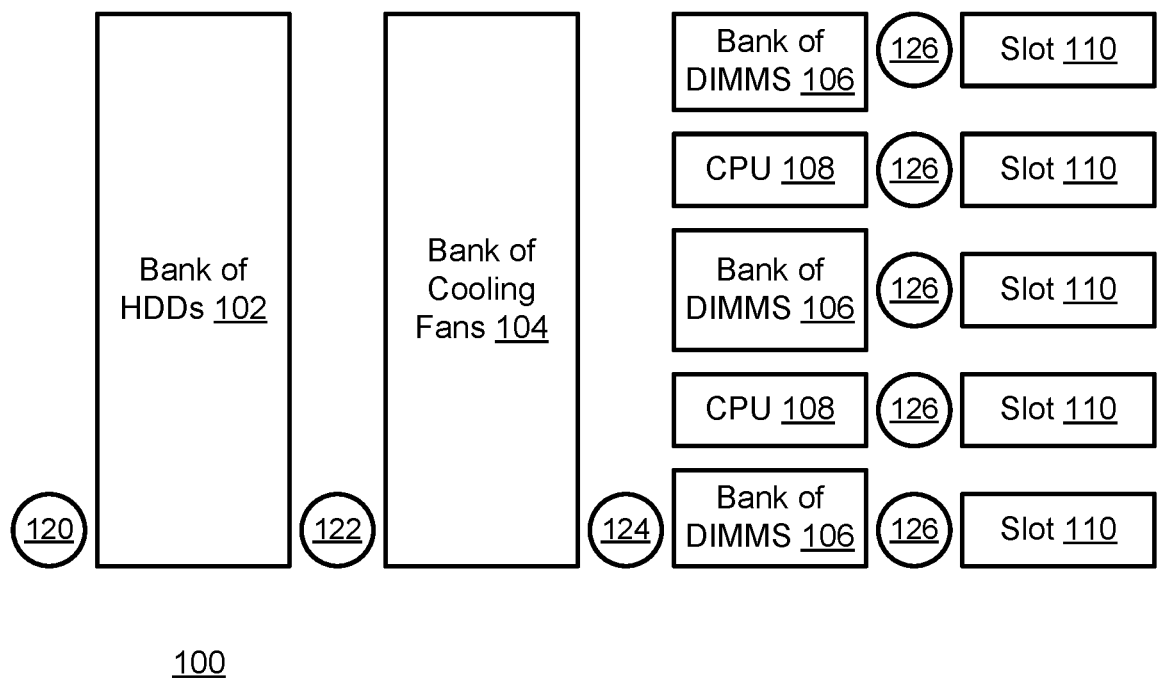
FIG. 1 is a diagram of a portion of an information handling system according to at least one embodiment of the present disclosure.

FIG. 1 shows an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a bank of hard disk drives (HDDs) 102, a bank of cooling fans 104, multiple banks of dual inline memory modules (DIMMs) 106, multiple central processing units (CPUs) or processors 108, multiple component slots 110, and an inlet temperature sensor 120, a cooling fan temperature sensor 122, a CPU DIMM temperature sensor 124, and multiple component slot sensors 126. In an example, a different component slot sensor 126 may be located at an inlet of a different component slot 110. In certain examples, component slot sensors 126 may be any suitable sensors or a combination of sensors, such as airflow velocity sensors, temperature sensors, a combination of velocity and temperature sensors. In an example, information handling system 100 may include multiple temperature sensors 120 along an air inlet of the information handling system. Information handling system 100 may also include multiple temperature sensors 122 in between bank of HDDs 102 and bank of cooling fans 104. Information handling system 100 may include multiple temperature sensors 124 between bank of cooling fans 104 and bank of DIMMs 106 and CPUs 108.

In previous information handling systems, a processor may utilize energy usage by the components of the information handling system to predict cooling airflow requirement. In these information handling systems, the processor may utilize a balance of the energy usages to predict the cooling airflow requirement. However, the determined or predicted cooling requirements for these previous information handling systems did not utilize cooling bottlenecks and hotspots and were not able to accurately determine a needed airflow. Information handling system 100 may be improved by processor 108, 402, or 404 determining a cooling requirement airflow based on temperature changes at different points within the information handling system, different airflow velocities within the information handling system, and energy usages of components within the information handling system. Additionally, information handling system 100 may further be improved by utilizing processor 108, 402, or 404 utilizing the determined airflow requirements during operation of the information handling system in a closed loop control system for speeds of cooling fans 104. As used herein, processor may refer to any suitable processor, such as processor 108 of FIG. 1, processor 402 or 404 of FIG. 4, or the like. Thus, operations described herein for processor 108 may be performed by any other processor within information handling system 100 or within another information handling system, such as information handling system 400, without varying from the scope of this disclosure.

During operation, processor 108 may perform one or more suitable operations to create a temperature map for any configuration or workload associated within information handling system 100. For example, processor 108 may execute an application of Design of Experiments (DOE), an application of Machine Learning (ML), or the like to develop a temperature map for different configurations or workloads for information handling system 100. In this example, processor 108 may simultaneously use multiple empirical equations, ML models, slot airflow characteristics, or the like to determine a minimum required airflow speed for information handling system. In an example, the empirical equations may be associated with preheat conditions of drive bank 102 and cooling fan bank 104. As used herein, a DOE may involve processor 108 implementing a statistical approach to optimizing test plans for efficiency while ensuring critical test coverage. The calculation of a minimum airflow in cubic feet per minute (CFM) for information handling system 100 may enable the information handling system to be more efficient. For example, if an initial airflow speed of the cooling fans is set to 100 CFM but an airflow speed of 80 CFM may provide all the components within information handling system 100 with a required amount of cooling, the information handling system may be more efficient operating the cooling fans at the lower airflow speed.

In an example, the operations performed by processor 108 may provide an improved assessment of system airflow efficiency. In certain examples, the assessment of airflow efficiency may be a calculation or comparison of an actual airflow consumed within information handling system 100 versus a theoretically or calculated required airflow to meet system cooling requirements. In an example, the calculated required airflow may further improve information handling system 100 through enhancements to an open loop thermal controls algorithm.

Processor 108 may further adopt a closed loop (CL) control of fan speeds of cooling fans 104 to bring a system CFM consumption as close to a theoretical value calculated by DOE or ML operations performed by the processor. In an example, processor 108 may utilize sensors 120, 122, 124, and 126 to perform the CL control of cooling fans 104.

In certain examples, processor 108 may enable a potential for predictive control implementation of system cooling, such that a calculated or anticipated CFM may allow information handling system to have a faster response to achieve a target fan speed for a particular workload. In an example, processor 108 may perform any suitable number of test to ensure that all necessary information within information handling system 100 is captured so that an accurate airflow requirement is calculated.

In an example, processor 108 may utilize any suitable number of variables to determine an accurate temperature of information handling system 100. For example, processor 108 may select characteristics for three components as main variables or factors. In an example, the selected characteristics may be CPU power, DIMM power, and system CFM. Processor 108 may perform multiple tests or calculations based on different operating levels for the selected components. In certain examples, the levels for the CPU power may be any suitable power levels, including but not limited to, 100 Watts, 150 Watts, 300 Watts, and 350 Watts. The levels for the DIMM power may be determined on a per DIMM basis and may include 8 Watts, 10 Watts, 12 Watts, 15 Watts, or the like. The system CFM values may be 100 CFM, 150 CFM, 200 CFM, 220 CFM, or the like. In an example, processor 108 may keep a characteristic for one component constant while vary the characteristics of components as shown in the exemplary tests performed by processor 108 are illustrated in Table 1 below:

TABLE 1

| Test | CPU Power | DIMM Power/DIMM | System CFM |
| --- | --- | --- | --- |
| 1 | 100 Watts | 8 Watts | 100 CFM |
| 2 | 100 Watts | 10 Watts | 150 CFM |
| 3 | 100 Watts | 12 Watts | 200 CFM |
| 4 | 100 Watts | 15 Watts | 220 CFM |
| 5 | 150 Watts | 8 Watts | 150 CFM |
| 6 | 150 Watts | 10 Watts | 200 CFM |
| 7 | 150 Watts | 12 Watts | 220 CFM |
| 8 | 150 Watts | 15 Watts | 100 CFM |
| 9 | 300 Watts | 8 Watts | 200 CFM |
| 10 | 300 Watts | 10 Watts | 220 CFM |
| 11 | 300 Watts | 12 Watts | 100 CFM |
| 12 | 300 Watts | 15 Watts | 150 CFM |
| 13 | 350 Watts | 8 Watts | 220 CFM |
| 14 | 350 Watts | 10 Watts | 100 CFM |
| 15 | 350 Watts | 12 Watts | 150 CFM |
| 16 | 350 Watts | 15 Watts | 200 CFM |

Processor 108 may calculate or determine data associated with each of the multiple tests. Processor 108 utilize the calculated data as inputs to machine learning (MVL) models, such as cooling fan speed prediction model 200 of FIG. 2, and the input data may be used train the MVL models to predict temperature for each point of interest in information handling system 100. In an example, the points of interest may include, but are not limited to, a BOSS inlet, a PSU inlet, and a PCIe inlet.

In certain examples, the ML models may be any suitable type of ML, such as Gaussian Process Regression, Linear Regression, Support Vector Machine, or the like. In an example, one or more of the trained models, such as Gaussian Process Regression, may have an average root mean square error (RMSE) for the predicted temperature of approximately 1° C. Processor 108 may repeat the multiple tests and ML model training for different front end configurations of information handling system 100. Additionally, the ML models, created by processor 108, may predict or account for possible temperature rises in information handling system 100 due to heating in DIMMs 106 and CPUs 108.

In an example, processor 108 may calculate the temperature rise due to heat from HDDs 102 and cooling fans 104 by using energy balance equations. In certain examples, energy balance calculations in processor 108 may be performed based on preheating temperatures across HDDs 102 and cooling fans 104 may be evenly distributed across a cross section of information handling system. Processor 108 may calculate temperature changes across bank of HDDs 102 using equation 1 below, and temperature changes across bank of cooling fans 104 using equation 2 below.

$$\Delta T_{HDD} = \frac{PWR_{HDD(+PERC)}}{CFM_{SYS} * \rho C_p} \quad \text{EQ. 1}$$

$$\Delta T_{Fan} = \frac{PWR_{Fan} * (1-n)}{CFM_{SYS} * \rho C_p} \quad \text{EQ. 2}$$

In equations 1 and 2 above, $\Delta T_{HDD}$ represents a calculated temperature change across bank of HDDs 102 and $\Delta T_{Fan}$ represents a calculated temperature change across bank of cooling fans 104. $PWR_{HDD(+PERC)}$ represents the power usage of bank of HDDs 102, and $PWR_{Fan}$ represents the power usage of bank of cooling fans 104. $CFM_{SYS}$ represents the CFM airflow within information handling system 100, and $\rho C_p$ represents air properties within the information handling system. In particular, $\rho$ represents airflow density and $C_p$ represents a heat capacity of the airflow within information handling system 100.

In an example, processor 108 may calculate temperature changes across different DIMMs 106 and CPUs 108 utilizing the trained ML models as represented in equation 3 below:

$$\Delta T_{CPU+DIMM} = \text{Trained ML Models} \quad \text{EQ. 3}$$

Outputs of the trained ML models may include, but is not limited to, a predicted minimum CFM airflow from cooling fans 106, a temperature of a first processor 108, a temperature of a second processor 108, an outlet temperature of information handling system 100, a power usage of the cooling fans, and an amount of CFM airflow per Watt used by the cooling fans. Processor 108 may utilize this output data to determine whether the different thermal requirement of information handling system may be met.

Based on the calculated temperature changes across bank of HDDs 102, bank of cooling fans 104, and data from the ML model, processor 108 may generate a temperature map for the configuration and workload of information handling system 100. In an example, processor 108 may use the generated temperature map to determine whether temperature and airflow requirements are met. For example, processor 108 may compare the calculated airflow for each slot 110 with a particular slot tier requirement to ensure the tier airflow requirement is met. Processor 108 may also compare the calculated temperature of each CPU 108 with a particular temperature limit to ensure the temperature of each CPU will remain below the temperature limit. Processor 108 may further ensure that other temperature thresholds within information handling system are not exceeded based on the lowest possible calculated airflow as described above.

In an example, slot tier airflow requirements may vary based on the component within a particular slot 110. For example, if the component within each of slots 110 is a PCIe adaptor, different PCIe adaptors may have different tier airflow requirements. In certain examples, the CFM airflow requirement in a particular tier may vary based on a temperature value measured by sensor 126 at the inlet of the associated slot 110. These different tier airflow requirements may be stored within a table in a memory of information handling system 100, and the memory may be substantially similar to memory 420 or 425 of FIG. 4. Processor 108 may utilize this table to compare the calculated airflow for each slot 110 with a particular slot tier requirement to ensure the tier airflow requirement is met. For example, processor 108 may receive the temperature at a particular slot from sensor 126 for that slot, read the CFM airflow requirement corresponding to the temperature and the tier from the table, and compare whether the calculated airflow is equal to or above the required airflow.

Figure 2:
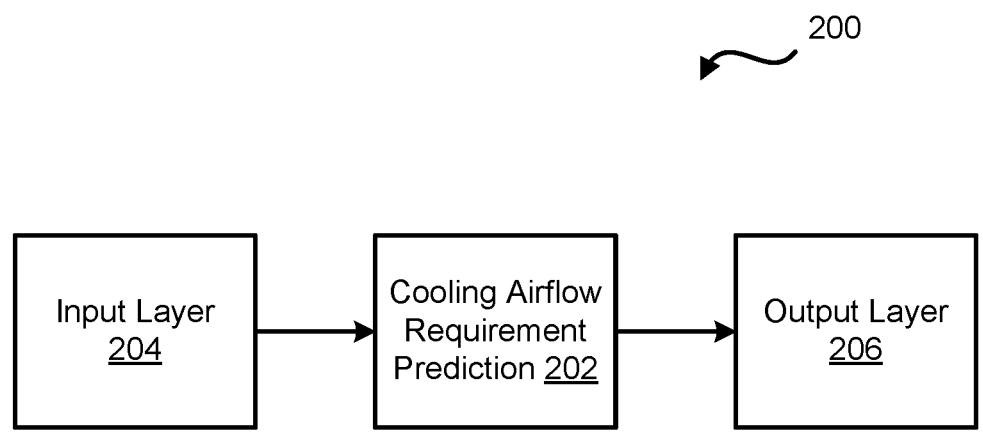
FIG. 2 is a diagram of a machine learning model according to at least one embodiment of the present disclosure.

FIG. 2 illustrates a cooling fan speed prediction model 200 according to at least one embodiment of the disclosure. Cooling fan speed prediction model 200 includes an input layer 202 to receive an input, one or more hidden layers 204 to perform one or more operations on input 202, and an output layer 206 to provide an output. In an embodiment, input at input layer 202 may include any suitable data associated with components of an information handling system. For example, the data may include, but is not limited to, an inlet ambient air temperature, an information handling system configuration type, a hard disk drive power level, a central processing unit power level, a dual in-line memory module power level, and an initial cooling fan speed. In certain examples, the initial cooling fan speed may be any suitable fan speed, which may be programed within the information handling system, may be selected by a user, or the like.

Based on performing operations at one or more hidden layers, cooling fan speed prediction model 200 may provide an output at output layer 206. In an example, the output may include, but is not limited to, a predicted minimum CFM airflow from the cooling fans, a temperature of a first processor, a temperature of a second processor, an outlet temperature of the information handling system, a power usage of the cooling fans, and an amount of CFM airflow per Watt used by the cooling fans. In certain examples, the predicted minimum CFM airflow may account for cooling limitations within information handling system 100, such as CPU heatsink resistances, system hotspots, or the like. In an example, the predicted or defined cooling airflow may be airflow stored within a memory of the information handling system, and the cooling airflow may be utilized by a processor during normal operation as an initial cooling airflow for a closed loop (CL) cooling fan control.

Figure 3:
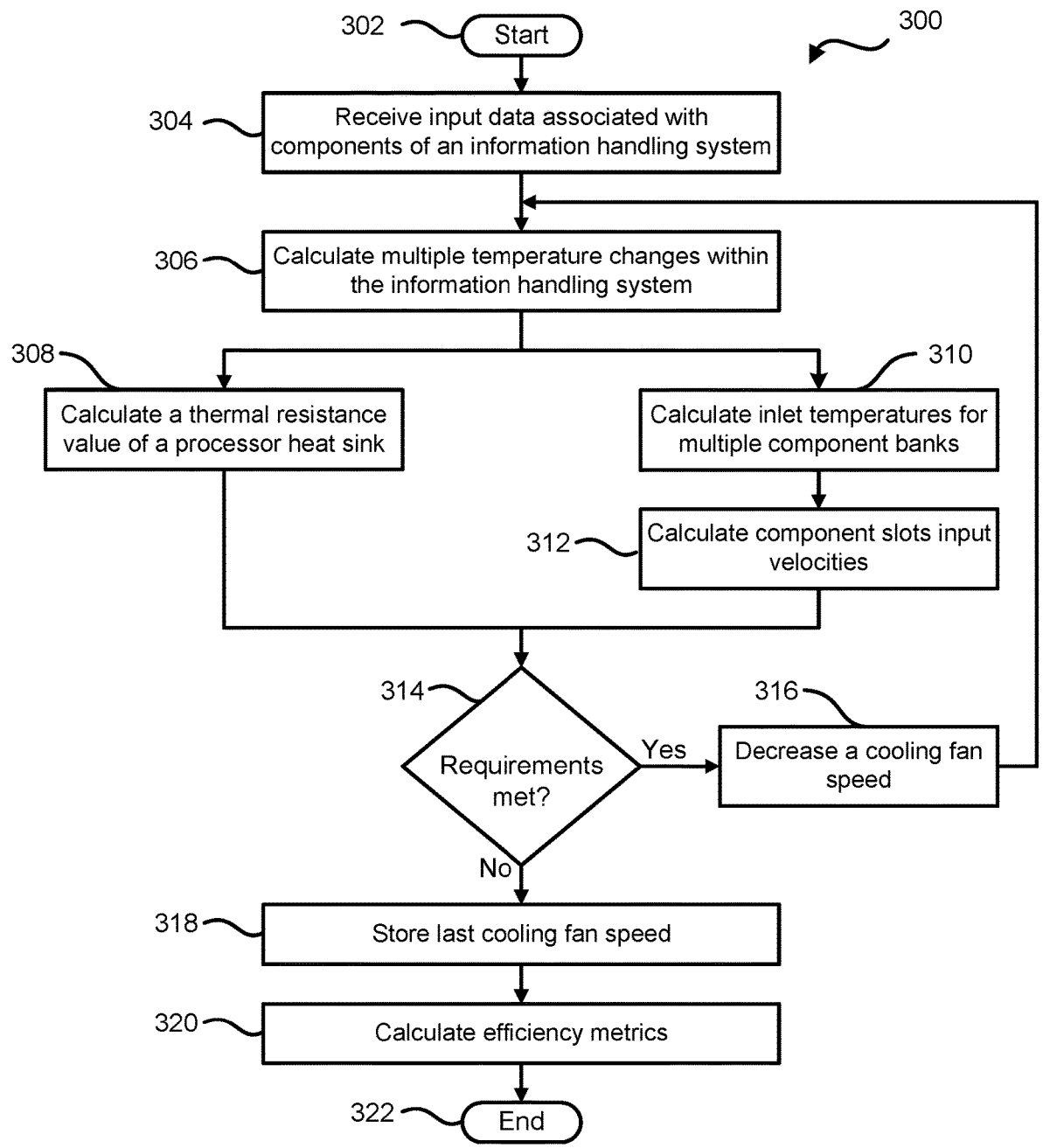
FIG. 3 is a flow diagram of a method for determining a cooling fan speed and efficiency metrics for an information handling system according to at least one embodiment of the present disclosure.

FIG. 3 illustrates a method 300 for detecting a system freeze according to at least one embodiment of the present disclosure, starting at block 302. In an example, the method 300 may be performed by any suitable component including, but not limited to, a processor, such as processor 108 of FIG. 1, processor 402 of FIG. 4, or processor 404 of FIG. 4. It will be readily appreciated that not every method step set forth in this flow diagram is always necessary, and that certain steps of the methods may be combined, performed simultaneously, in a different order, or perhaps omitted, without varying from the scope of the disclosure.

At block 304, input data associated with components of an information handling system is received. In an example the input data may include, but is not limited to, an inlet ambient air temperature, an information handling system configuration type, a hard disk drive power level, a central processing unit power level, a dual in-line memory module power level, and an initial cooling fan speed. In certain examples, the initial cooling fan speed may be any suitable fan speed, which may be programed within the information handling system, may be selected by a user, or the like.

At block 306, multiple temperature changes within the information handling system are calculated. In an example, each of the temperature changes may be measured across a different component or set of components within the information handling system. For example, one temperature change may be calculated over a bank of HHDs, another temperature change may be calculated over a bank of cooling fans, and a different temperature change may across a bank of CPUs and DIMMs. In certain examples, the temperature changes may be calculated from empirical or theoretical equations. In an example, block 308 may be performed substantially in parallel with blocks 310 and 312.

At block 308, a thermal resistance value for a heat sink of a processor is calculated or determined. In an example, the thermal resistance value may be calculated in suitable manner including, but not limited to, based on an electrical resistance of the heat sink, and an empirical equation utilizing a theoretical metric value for the CPU. In certain examples, the thermal resistance value may be used to determine a limit of the CPU based on temperatures within the information handling system.

At block 310, inlet temperatures for multiple components banks are calculated or determined. In an example, the component bank may include, but is not limited to, a PCIe bank, a power supply unit bank, a GPU bank, a BOSS bank, a PCIe bank, and a CPU DIMM bank. In certain examples, these component bank inlet temperatures may be calculated in any suitable manner, such as empirical equations. The empirical equations may be utilized by and calculated within a machine learning (ML) system, such as ML system 200 of FIG. 2.

At block 312, a component slot inlet velocity for each component slot within the information handling system may be calculated or determined. In an example, the component slot inlet velocities may be calculated based on empirical correlations performed by a processor of the information handling system. These component slot inlet velocities may be used to get inlet airflow at each component slot, and the component slots may be PCIe slots of the information handling system. In certain examples, the airflow may be calculated in any suitable measurement, such as linear feet per minute (LFM).

At block 314, a determination is made whether multiple requirements for the information handling system are met. In an example, the requirements may include, but are not limited to, whether case temperature requirements for the CPU and particular tier airflow velocities at each of the component slots are met. The case temperature requirement may be based on a power of the CPU, and the tier airflow velocity may be a CFM for the airflow. If at least one of the requirements is not met, a current cooling fan speed is decreased at block 316 and the flow continues at block 306.

If both requirements are met, the last cooling fan speed, such as a current cooling fan speed, is stored at block 318. At block 320, efficiency metrics for the information handling system are calculated and the flow ends at block 322. In an example, the efficiency metrics may be calculated by any suitable means, such as a comparison of the total power of the information handling system and the power of the cooling fans. In certain example, the smaller efficiency numbers the more efficient the cooling of the components within the information handling system.

Figure 4:
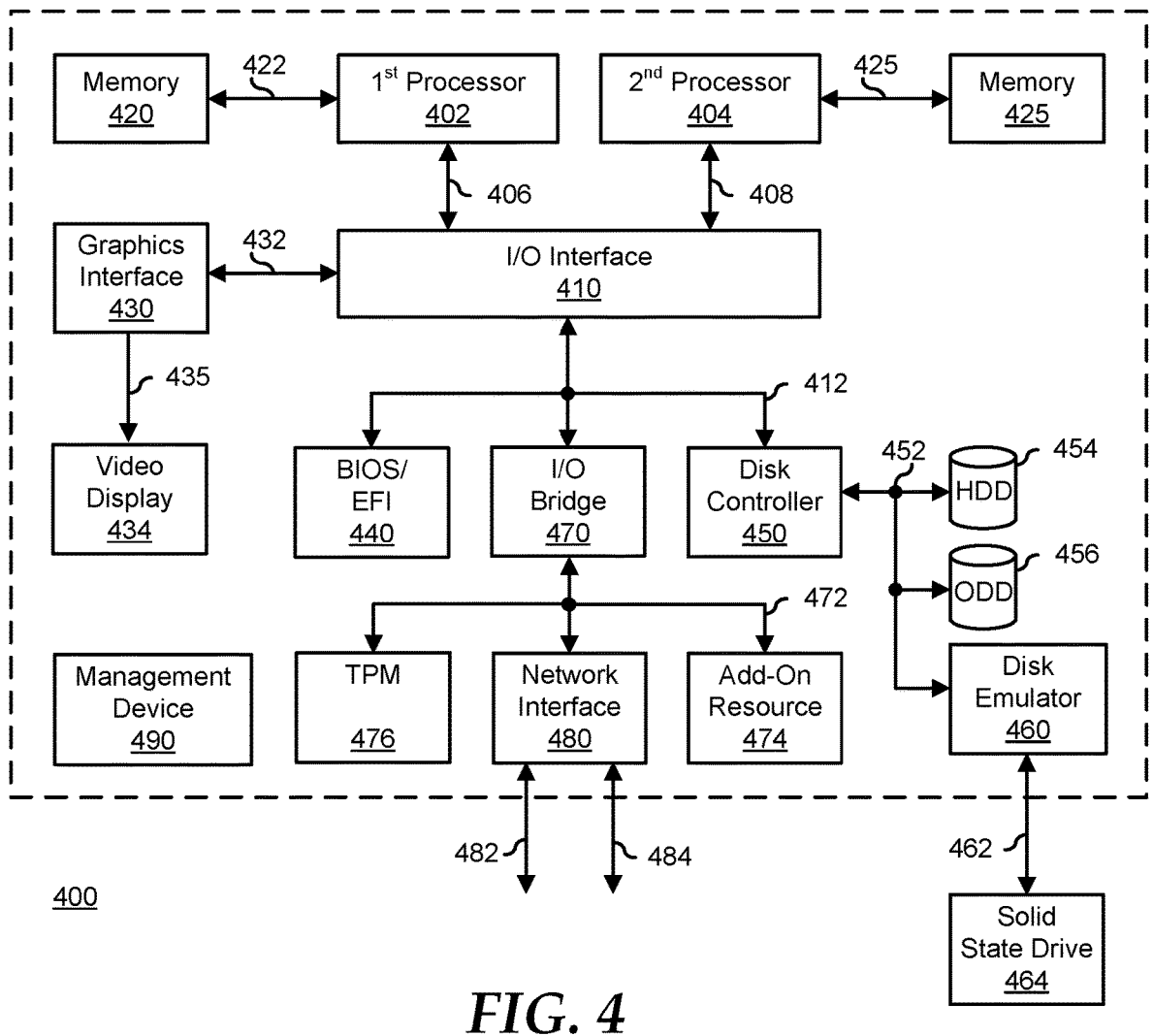
FIG. 4 is a block diagram of a general information handling system according to an embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources.

BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
a memory; and
a processor configured to communicate with the memory, the processor to:
calculate a plurality of temperature changes within the information handling system, wherein each of the temperature changes is across a different bank of components of the information handling system;
calculate a plurality of inlet temperatures within the information handling system, wherein each of the inlet temperatures is associated with a different slot of bank of components of the information handling system, wherein a first slot of bank of components includes a first set of components, and a second slot of bank of components includes a second set of components, wherein the first set of components includes different type of components as compared to the second set of components;
determine a cubic feet per minute (CFM) airflow requirement corresponding to a current temperature in the information handling system;
determine a plurality of slot tier airflow velocity requirements including a first second slot tier airflow velocity requirement for the first slot of bank of components and a second slot tier airflow velocity requirement for the second slot of bank of components, wherein each of the slot tier airflow velocity requirements is based on different components within different corresponding slots of the information handling system;
determine whether calculated airflows for the different slots equal corresponding one of the slot tier airflow velocity requirements including:
determine whether a first calculated airflow for the first slot equals the first slot tier airflow requirement; and
determine whether a second calculated airflow for the second slot equals the first slot tier airflow requirement;
based on the temperature changes, the inlet temperatures, the CFM requirement, and whether calculated airflows for the different slots equal corresponding ones of the slot tier airflow velocity requirements, determine whether cooling cooling requirements for a system configuration are met;
in response to the cooling requirements for the system configuration not being met, decrease a current cooling fan speed for the information handling system; and
in response to the cooling requirements for the system configuration being met, store the current cooling fan speed.

2. The information handling system of claim 1, wherein the processor further to:
calculate a total power usage of components within the information handling system;
calculate a cooling fan power usage within the information handling system; and
calculate an efficiency of the information handling system based on the total power usage and the cooling fan power usage.

3. The information handling system of claim 1, wherein the temperature changes include a first temperature across a bank of hard disk drive of the information handling system, and a second temperature change across a bank of cooling fans of the information handling system.

4. The information handling system of claim 1, wherein the processor is further configured to: calculate a thermal resistance value for a heat sink of a central processing unit.

5. The information handling system of claim 4, wherein the processor is further configured to:
calculate a power usage of the central processing unit; and
determine whether a thermal resistance requirement for the central processing unit is met based on the thermal resistance value of the heat sink and the power usage of the central processing unit.

6. The information handling system of claim 1, wherein data is received from a user input received by the processor.

7. The information handling system of claim 1, the processor further to receive data from components of the information handling system.

8. The information handling system of claim 7, wherein the data includes an inlet ambient air temperature, an information handling system configuration type, a hard disk drive power level, a central processing unit power level, a dual in-line memory module power level, and the initial cooling fan speed.

9. A method comprising:
storing, in a memory of an information handling system, data associated with cooling of the information handling system;
calculating a plurality of temperature changes within the information handling system, wherein each of the temperature changes is across a different bank of components of the information handling system;
calculating a plurality of inlet temperatures within the information handling system, wherein each of the inlet temperatures is associated with a different slot of bank of components of the information handling system, wherein a first slot of bank of components includes a first set of components, and a second slot of bank of components includes a second set of components, wherein the first set of components includes different type of components as compared to the second sets of components;
determining a cubic feet per minute (CFM) airflow requirement corresponding to a current temperature in the information handling system;
determining a plurality of slot tier airflow velocity requirements including a first second slot tier airflow velocity requirement for the first slot of bank of components and a second slot tier airflow velocity requirement for the second slot of bank of components, wherein each of the slot tier airflow velocity requirements is based on different components within different corresponding slots of the information handling system;
determining whether calculated airflows for the different slots equal corresponding ones of the slot tier airflow velocity requirements including:

determining whether a first calculated airflow for the first slot equals the first slot tier airflow requirement; and determining whether a second calculated airflow for the second slot equals the first slot tier airflow requirement;

based on the temperature changes, the inlet temperatures, the CFM requirement, and whether calculated airflows for the different slots equal corresponding ones of the slot tier airflow velocity requirements, determining whether cooling requirements for a system configuration are met;

in response to the cooling requirements for the system configuration not being met, decreasing a current cooling fan speed for the information handling system; and in response to the cooling requirements for the system configuration being met, storing the current cooling fan speed.

10. The method of claim 9, further comprising:
calculating a total power usage of components within the information handling system;
calculating a cooling fan power usage within the information handling system; and
calculating an efficiency of the information handling system based on the total power usage and the cooling fan power usage.

11. The method of claim 9, wherein the temperature changes include a first temperature across a bank of hard disk drive of the information handling system, and a second temperature change across a bank of cooling fans of the information handling system.

12. The method of claim 9, further comprising calculating a thermal resistance value for a heat sink of a central processing unit.

13. The method of claim 12, further comprising:
calculating a power usage of the central processing unit; and
determining whether a thermal resistance requirement for the central processing unit is met based on the thermal resistance value of the heat sink and the power usage of the central processing unit.

14. The method of claim 9, wherein the data is received from a user input received by the processor.

15. The method of claim 9, further comprising receiving the data from components of the information handling system.

16. The method of claim 9, wherein the data includes an inlet ambient air temperature, an information handling system configuration type, a hard disk drive power level, a central processing unit power level, a dual in-line memory module power level, and the initial cooling fan speed.

17. An information handling system comprising a processor configured to:
calculate a plurality of temperature changes within the information handling system, wherein each of the temperature changes is across a different bank of components of the information handling system, wherein the temperature changes include a first temperature across a bank of hard disk drive of the information handling system, and a second temperature change across a bank of cooling fans of the information handling system;

determine a plurality of inlet temperatures within the information handling system, wherein each of the inlet temperatures is associated with a different slot of bank of components of the information handling system, wherein a first slot of bank of components includes a first set of components, and a second slot of bank of components includes a second set of components, wherein the first set of components includes different type of components as compared to the second sets of components;

determine a cubic feet per minute (CFM) airflow requirement corresponding to a current temperature in the information handling system;

determine a plurality of slot tier airflow velocity requirements, wherein each of the slot tier airflow velocity requirements is based on different components within different corresponding slots of the information handling system including a first second slot tier airflow velocity requirement for the first slot of bank of components and a second slot tier airflow velocity requirement for the second slot of bank of components;

determine whether calculated airflows for the different slots equal corresponding ones of the slot tier airflow velocity requirements including:
determine whether a first calculated airflow for the first slot equals the first slot tier airflow requirement; and
determine whether a second calculated airflow for the second slot equals the first slot tier airflow requirement;

if cooling requirements for the system configuration are not met, then decrease a current cooling fan speed for the information handling system, wherein the cooling requirements are based on the temperature changes, the inlet temperatures, the CFM requirement, and whether calculated airflows for the different slots equal corresponding ones of the slot tier airflow velocity requirements;

if the cooling requirements are met, then store the current cooling fan speed;

calculate a total power usage of components within the information handling system;

calculate a cooling fan power usage within the information handling system; and calculate an efficiency of the information handling system based on the total power usage and the cooling fan power usage.

18. The information handling system of claim 17, wherein the processor is further configured to calculate a thermal resistance value for a heat sink of a central processing unit.

19. The information handling system of claim 18, wherein the processor is further configured to calculate a power usage of the central processing unit; and determine whether a thermal resistance requirement for the central processing unit is met based on the thermal resistance value of the heat sink and the power usage of the central processing unit.

20. The information handling system of claim 17, wherein the data includes an inlet ambient air temperature, an information handling system configuration type, a hard disk drive power level, a central processing unit power level, a dual in-line memory module power level, and the initial cooling fan speed.

* * * * *

UNITED STATES PATENT AND TRADEMARK OFFICE
CERTIFICATE OF CORRECTION

PATENT NO. : 12,235,694 B2
APPLICATION NO. : 17/846402
DATED : February 25, 2025
INVENTOR(S) : Ahmed et al.

It is certified that error appears in the above-identified patent and that said Letters Patent is hereby corrected as shown below:

In the Claims

Column 11, Line 45: Please change "one" to --ones--

Signed and Sealed this
First Day of April, 2025

Coke Morgan Stewart
*Acting Director of the United States Patent and Trademark Office*